Nov. 7, 1939.  H. T. KRAFT  2,179,374
PNEUMATIC CORD TIRE AND CORD TIRE FABRIC
Filed Aug. 19, 1937
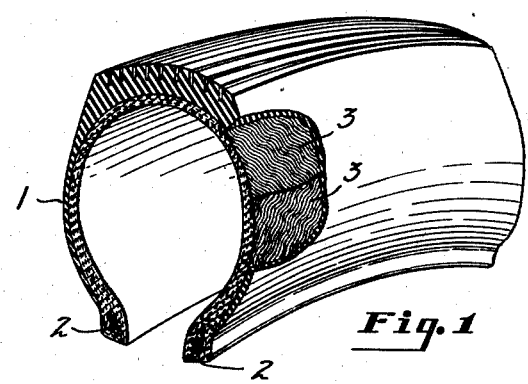
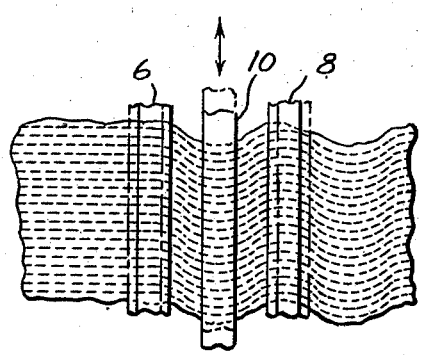
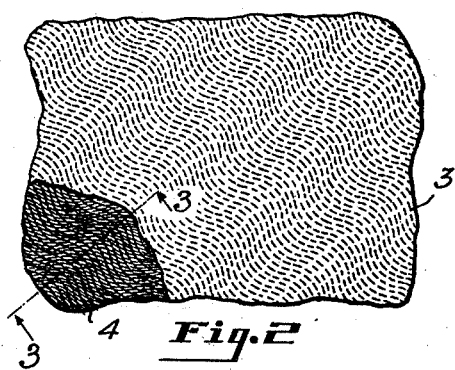
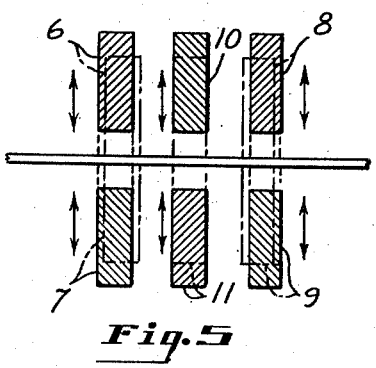
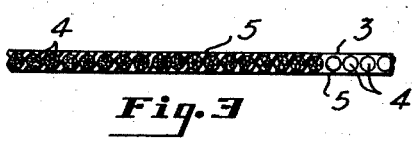
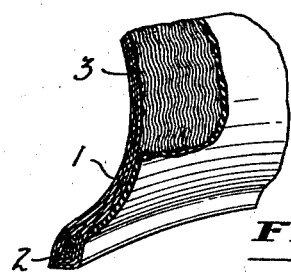
INVENTOR
Herman T. Kraft
BY Evans + McCoy
ATTORNEYS Patented Nov. 7, 1939

2,179,374

UNITED STATES PATENT OFFICE 2,179,374

PNEUMATIC CORD TIRE AND CORD TIRE FABRIC

Herman T. Kraft, Akron, Ohio, assignor to The General Tire & Rubber Company, Akron, Ohio, a corporation of Ohio Application August 19, 1937, Serial No. 159,917

3 Claims. (Cl. 152—359)

This invention relates to pneumatic tires, and particularly to a cord fabric reinforcement for pneumatic tire carcasses.

In cord tire casings, as heretofore constructed, the reinforcement consists of superposed plies of fabric, each ply of which is formed of closely spaced, straight, parallel cords, bonded together with rubber. The cords were disposed diagonally of the casing and extended diagonally from one bead to the other thereof, individual plies of cords being arranged with the cords thereof disposed transversely of the cords of adjacent plies.

The modern tendency in tire construction is to build tires of relatively large cross sectional area which operate with a relatively low inflation pressure. The lower internal air pressure in such tires causes a higher percentage of the load to be imposed upon the tire carcass and, since the tire carcass has but little elasticity, the large tires operated at low pressures, although more yieldable than high pressure tires, are less elastic. Regardless of the size of the tire, however, an increased load is imposed upon the tire carcass upon deflection of the tire due to impact against surface irregularities of roads over which the vehicle travels. Cord tire carcasses, as heretofore constructed, are quite flexible, in that they bend readily, but the tire carcass is deficient in elasticity, for the reason that superposed layers of fibrous cords forming the reinforcement have very little elasticity under tension, and practically no elasticity under compressive thrust. The lack of elasticity of such tires detracts from the cushioning action thereof and from the riding qualities.

It is an object of the present invention to provide a cord-reinforced tire carcass which possesses the necessary strength, and which also has greater elasticity by reason of the disposition of the cords in the elastic rubber in which they are imbedded, thereby improving the cushioning action of the tire and providing a tire of superior wearing qualities, due to the greater ability of the fabric portion of the cord to withstand severe local distortion, such as may be caused in passing over irregularities on a road surface.

A further object of the invention is to provide a tire in which the individual reinforcing cords are normally subject to very little tension in an inflated tire, so that the elasticity and strength of the individual cords are retained during a long period of service.

A further object is to provide a cord tire in which the fabric portion of the carcass is elastic and compressible, so that it is capable of yielding and recovering in response to excessive stresses on small areas of the tire periphery.

The present invention provides a tire carcass in which the fabric portion has high elastic recovery, thereby improving the riding qualities of the tire and also improving the wearing qualities by protecting the individual cords against excessive stresses tending to rupture the cords and cause separation of the plies.

With the above and other objects in view, the invention may be said to comprise the tire and fabric as illustrated in the accompanying drawing, hereinafter described, and particularly set forth in the appended claims, together with such variations and modifications thereof as will be apparent to one skilled in the art to which the invention appertains.

Reference should be had to the accompanying drawing forming a part of this specification, in which:

Figure 1 is a fragmentary perspective view showing a tire constructed in accordance with the present invention;

Fig. 2 is a fragmentary plan view of a piece of the reinforcing fabric used in the construction of the tire casing shown in Fig. 1;

Fig. 3 is a transverse section through the fabric shown in Fig. 2 taken on the line indicated at 3—3 in Fig. 2;

Fig. 4 is a plan view of a device which may be used for forming bends in the cords of a piece of rubberized cord tire fabric; and Fig. 5 is a vertical section through the cord bending device shown in Fig. 4;

Fig. 6 is a fragmentary perspective view showing a modified tire construction.

Referring to the accompanying drawing, Fig. 1 shows a tire casing 1, provided with seating beads 2 along opposite edges thereof, and reinforced with a suitable number of plies 3 of cord fabric extending transversely throughout the width of the casing from bead to bead. The plies 3 are all of the same construction, each consisting of a sheet of substantially parallel, closely spaced cords 4, held together by upper and lower layers of rubber 5. The layers of rubber 5 may be applied to the sheet of cords in the conventional way on a rubber calender which presses the unvulcanized rubber sheets into the fibers of the cords and between the cords to firmly bind the cords and rubber together in a flat sheet.

The cord fabric of the present invention differs from conventional cord fabric, in that the individual cords, instead of extending straight, are alternately bent back and forth in the plane of the sheet throughout the length of the fabric, each cord being bent to a serpentine or zigzag form, the bends in each cord being alternately in opposite directions at substantially uniform intervals, as in the sine curve. The cords are herein referred to as sinusoidally extending cords. It is to be understood, however, that the term "sinusoidally" as used herein does not necessarily mean that the bends need be exactly uniform, or that the curvature of the bends has the regularity of any mathematical curve, the term "sinusoidally" being understood to mean having a succession of bends like a sine curve and intended to include zigzag or serpentine arrangements, in which the bends may be curved or angular, and in which the bends may be regular or irregular.

The fabric of the present invention formed by any feasible method of which I am aware would have fairly uniform bends at fairly uniformly spaced intervals along the length of the cords. However, the advantages of the invention would be obtained even though the form of the bends and the spacing thereof had considerable irregularity.

One way of forming the fabric of the present invention is to form the bends in the cords in the process of feeding the cords to a rubber-applying calender, in which case it is simply necessary to impart a lateral oscillating motion in the plane thereof to the sheet of cords being fed to the bight of the rubber-applying calender.

Another method is shown in Figs. 4 and 5, in which a strip of conventional cord fabric, which has been formed in a rubber-applying calender, is fed intermittently between the jaws of a series of clamps, one or more intermediate clamps of the series having an endwise movement after gripping the fabric to offset a portion of the strip laterally. As shown in Figs. 4 and 5, a set of clamps may consist of a pair of clamps, one having upper and lower clamping jaws 6 and 7 and the other clamping jaws 8 and 9, the said clamps being mounted for limited lateral movement, and an intermediate clamp consisting of a pair of clamping jaws 10 and 11, the intermediate clamp being mounted for endwise movement. After each operation of the clamp the strip of cord fabric is moved longitudinally a distance sufficient to bring a straight portion of the strip between the three pairs of clamping jaws. After the clamping jaws have been brought together to clamp the strip, the intermediate clamp, comprising the jaws 10 and 11, is moved in an endwise direction, while the other two clamps are simultaneously moved laterally toward the central clamping jaws 10 and 11. The intermediate portion of the fabric is moved laterally, as shown in Fig. 4, while the portions of the fabric on opposite sides thereof are held against lateral movement by the clamping jaws 6, 7, 8 and 9. To permit lateral movement of the portion of the sheet clamped by the jaws 10 and 11, the jaws 6 and 7, and 8 and 9, are permitted to have a slight lateral movement toward the jaws 10 and 11 during the endwise movement of the jaws 10 and 11. The bending of the cords of the fabric is performed prior to vulcanization of the rubber and the fabric strip retains the form to which it is forced by the clamping jaws. A complete fabric strip, therefore, has longitudinal, closely spaced cords lying in the plane of the strip which extend sinusoidally from one end of the strip to the other. This fabric can be cut diagonally to form tire building strips. The tire building strips may be laid in plies in forming the tire carcass on a core or drum in the conventional manner. The plies 3 of cord fabric may be laid one upon another in the tire carcass with the cords extending diagonally and with the cords of successive plies of opposite angularity as shown in Fig. 1 or some or all the plies may be laid with the cords extending radially as shown in Fig. 6.

The tire carcass of the present invention differs from the conventional cord fabric tire carcass, in that each cord in the tire carcass extends sinusoidally from bead to bead, instead of in a straight path. The cords lie in superposed layers, as in the conventional tire, but, by reason of the sinusoidal, zigzag, or serpentine form of the cords, each layer of cord fabric has elasticity longitudinally of the cords, as well as transversely. In the conventional tire the individual cords are put under tension by inflation. In the tire of the present invention the expansion of the tire carcass, due to inflation pressure, is resisted almost wholly by the elastic rubber binding the individual cords together and binding the superposed layers of cords.

The fabric portion of the tire carcass of the present invention is, therefore, inherently elastic, the rubber being interspersed in thin layers between the individual cords of each ply and between the cords of superposed plies of fabric and exerting its elasticity to resist any deflection of the fabric portion of the carcass. Severe local distortion in passing over sharp irregularities on a road surface are readily absorbed by the fabric carcass, due to the elasticity thereof and to the capability of the fabric to stretch in any direction without damage to the cords. The fabric portion of the carcass is elastically compressible, as well as elastic, under tension. In the conventional tire the individual cotton cords have some elasticity, but the elasticity thereof is limited. The cords have slight recovery when elongated by tension but offer no elastic resistance to compression thrusts. In the tire of the present invention the fabric portion of the carcass has elastic recovery under compression, as well as under tension. Furthermore, by reason of the fact that tension stresses are taken by the rubber of the tire, instead of by the fibers of the cords, as in the conventional tire, the cords are not subjected to so great an extent to stresses that tend to break them or to rupture the connection between individual parallel cords, or between the crossing cords of successive plies.

The greater elasticity of the tire carcass makes for easy riding, and the imposition of a greater proportion of the load on the rubber of the tire carcass lessens the danger of injury to the reinforcing fabric.

Furthermore, it is to be understood that the particular forms of apparatus shown and described, and the particular procedure set forth, are presented for purposes of explanation and illustration, and that various modifications of said apparatus and procedure can be made without departing from my invention as defined in the appended claims.

What I claim is:

1. A pneumatic tire casing of vulcanized rubber having cords embedded therein, the cords lying side by side substantially parallel and closely spaced to form a sheet of reinforcing cords, the cords bending back and forth in the plane of the sheet to provide a series of relatively short closely spaced undulations along the length of each cord, the undulations of the cords permitting portions of the cords lying within restricted areas to straighten and permit local stretching of the tire carcass under severe local impacts, whereby the tire carcass may be subjected to severe local distortions without subjecting the cords to excessive tensile stresses.

2. A pneumatic tire casing of vulcanized rubber having a plurality of superposed cord plies embedded therein, the cords of each ply lying side by side and closely spaced to form a sheet of reinforcing cords, the cords of each ply extending diagonally from one bead of the tire casing to the other, the angularity of certain of the plies being opposite that of other of the plies, the cords of each ply bending back and forth in the plane of the sheet to provide a series of relatively short closely spaced undulations along the length of each cord, the undulations of the cords permitting the portions of the cords lying within restricted areas to straighten and permit local stretching of the tire carcass under severe local impacts, whereby the tire carcass may be subjected to severe local distortions without subjecting the cords to excessive tensile stresses.

3. A tire cord fabric comprising a flat rubber sheet having a series of closely spaced sinusoidally extending longitudinal cords disposed in parallel relation and embedded therein, the individual cords being bent alternately back and forth laterally in the plane of the sheet to provide relatively short undulations at closely spaced intervals throughout the length of the cords.

HERMAN T. KRAFT.